Jan. 5, 1965            D. F. BUCKLEY            3,164,450

APPARATUS TO CONVERT OIL TO GAS

Filed Jan. 30, 1962            2 Sheets-Sheet 1

INVENTOR.
Daniel F. Buckley
BY Harold E. Cole
Attorney

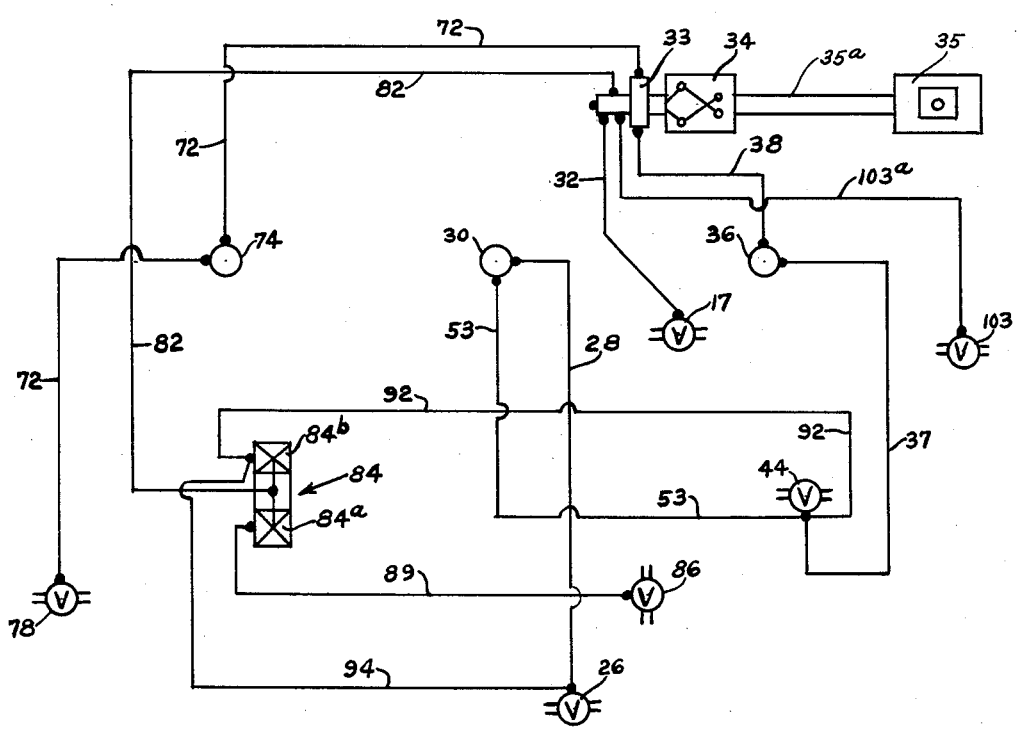

United States Patent Office 3,164,450
Patented Jan. 5, 1965

3,164,450
APPARATUS TO CONVERT OIL TO GAS
Daniel F. Buckley, 17 Frederick St., Belmont, Mass.
Filed Jan. 30, 1962, Ser. No. 169,742
10 Claims. (Cl. 48—106)

This invention relates to apparatus that converts oil to gas. Reference is made to my Patent No. 3,107,719 dated October 22, 1963.

One object of my invention is to provide apparatus that brings oil and a gas together, and under high heat and pressure converts this mixture to gas, using the gas so created to feed a burner that heats the mixture.

Another object is to so connect certain of the parts forming my apparatus that a system is provided that is under substantially the same pressure throughout, hence said mixture, due to the pressure it is under, will become a fine spray immediately prior to applying heat to it for the purpose of gasifying it.

A further object is to provide automatically operating controls in my apparatus so that gas will be created and stored when needed up to a predetermined pressure point, whereupon the operation will automatically be discontinued, as well as provide other automatic controls for various purposes, as later explained.

The foregoing and other objects which will appear as the nature of the invention is better understood, may be accomplished by a construction, combination and arrangement of parts such as is disclosed in the drawing. The nature of the invention is such as to render it susceptible to various changes and modifications, and, therefore, I am not to be limited to the construction disclosed by the drawing, nor to the particular parts described in the specification; but am entitled to all such changes therefrom as fall within the scope of my claims.

In the drawing:

FIG. 2 is a diagrammatic view of the electrical circuit for my apparatus.

Figure 1:
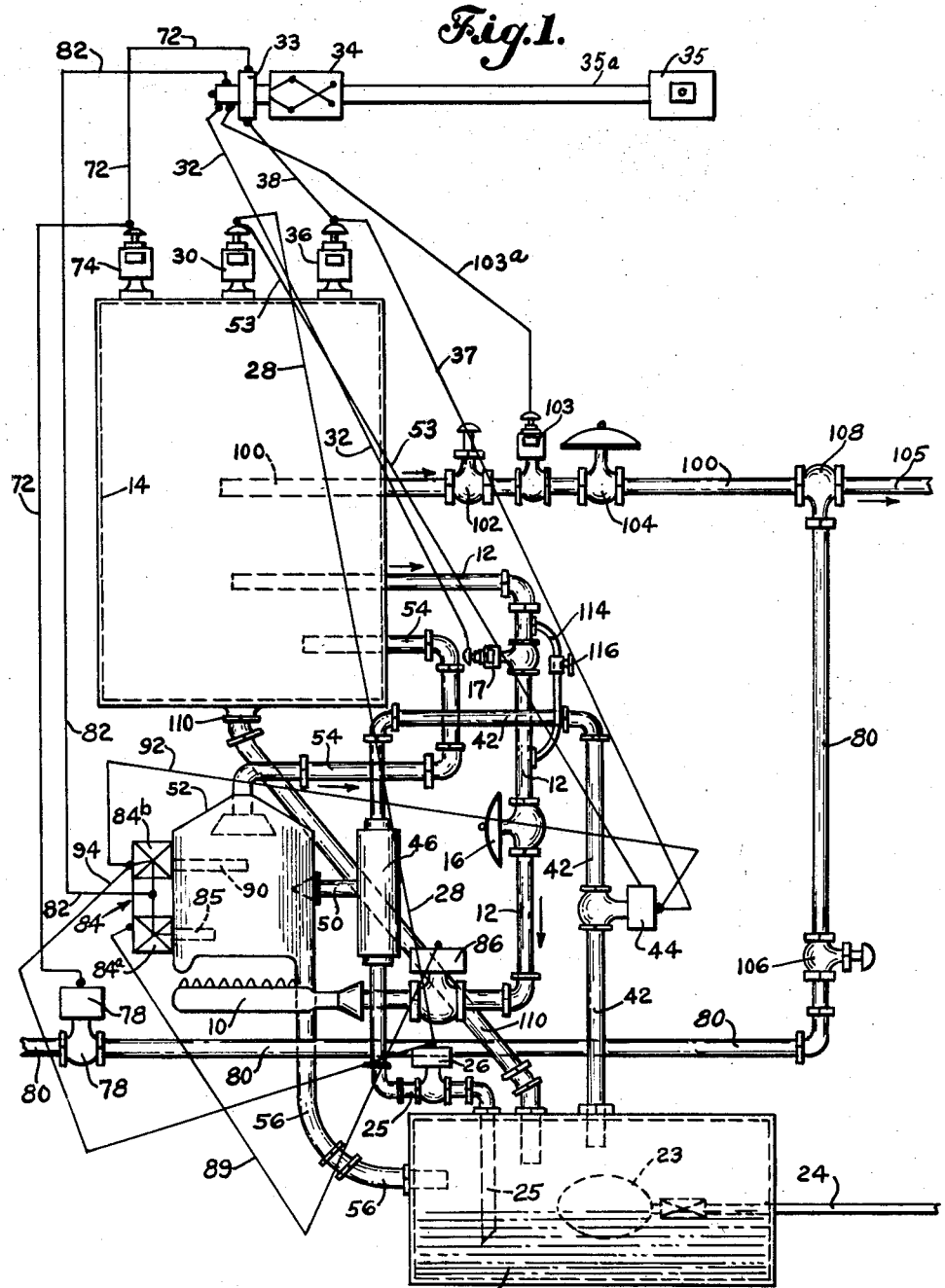
FIG. 1 shows a schematic layout of my apparatus.

As illustrated, a schematic layout of one form of my invention is shown, which has a well-known heating burner 10. The supply of fuel to said burner is principally a gas hereafter referred to as—oil gas—which flows through a supply conduit 12 that enters a storage tank or container 14 that holds said oil-gas under a predetermined pressure—up to 220 lbs., or other pressure, for instance. Said conduit 12 has a pressure reducing valve 16 therein to regulate the pressure of oil-gas fed to said burner 10. This conduit 12 also has a pressure regulating valve 17, later explained.

A supply receptacle 22 holds oil, and also oil-gas, the oil line being determined by a well-known float valve 23. An oil supply conduit 24 communicates with said receptacle 22. An oil delivery conduit 25 extends below the oil line in said receptacle 22 and has a dual-action control valve 26 therein that is electrically controlled by means of electric current passing through an electric wire 28 that connects with a pressure control device 30 on said tank 14. From said pressure regulating valve 17, a wire 32 extends to an electric switch 33 connected to an electric circuit panel board 34. A control switch 35 may be connected to an electrical supply source, not shown, and from which an electric wire 35a extends to switch 33.

A dual-action control valve 44, later described, is connected to a pressure control device 36 on said tank 14 by an electric wire 37. Another electric wire 38 connects said device 36 with said electric switch 33. A conduit 42 extends to said tank 22, terminating at a point above the oil line so that only oil-gas can enter it.

This conduit 42 has a dual-action control valve 44 and continues in the form of a mixing chamber 46 therein, which communicates with said fuel oil conduit 25, and it also has a conduit shown as a spray nozzle 50 extending therefrom and entering a retort 52. An electric wire 53 extends from said valve 44 to said pressure control device 30 so that electric current can pass to said control device 30 and said wire 28, as later explained. When said device 30 receives electric current said control valve 26 is actuated through said wire 28 thereby delivering fuel oil to mixing chamber 46 and then to retort 52.

A mixture under pressure, of oil and oil-gas in the form of a fine, atomized spray thus is delivered to said retort and is converted by heat and pressure into oil-gas that passes therefrom through a conduit 54 to said tank 14. A conduit 56 preferably extends from said retort 52 to a point above the oil line in said receptacle 22 to thus drain away any oil that might possibly result from condensation during the creation of oil-gas in said retort 52.

A wire 72 extends from switch 33 to a pressure control device 74 that is connected to tank 14 and thence continues to a city gas control valve 78 that is connected to a conduit 80 through which city or outside gas can be supplied to my apparatus if needed. An electric circuit between panel board 34, switch 33, wire 72 and pressure control device 74 is continuously established.

An electric wire 82 extends from said switch 33 to an electrical double switch circuit 84 having two separate switches 84a and 84b operable respectively by thermostats 85 and 90 in response to temperature changes, as later described. A wire 89 extends from said switch 84a to an oil-gas control valve 86 that controls the supply of gas to said burner 10 and which is preferably equipped with a well-known pilot by-pass. An electric wire 92 extends from said thermostat switch 84b to said dual-action valve 44. Another electric wire 94 extends from said switch 84b to dual-action fuel oil valve 26.

A conduit 100 extends from said tank 14 and it has a hand valve 102 that is normally open, but can be closed to shut off the flow of oil-gas through it when desired, as in an emergency. Said conduit 100 also has a pressure regulating valve 103 connected thereto, and also a pressure reducing valve 104. This conduit 100 can supply oil-gas to any desirable accessory such as a furnace through a withdrawal conduit 105 extending outside my system. An electric wire 103a connects said pressure regulating valve 103 with said electric switch 33.

Said gas conduit 80 has a hand control valve 106 connected thereto and thence said conduit 80 extends to a T 108 that connects said conduits 100, 80 and 105.

A conduit 110 communicates with said tank 14 and to a point above the oil line in said receptacle 22 to thereby drain away any condensation oil that may possibly develop in said tank 14. This conduit 110 aids in equalizing the pressure throughout the system.

Connected to said conduit 12 is a by-pass conduit 114 having a hand control valve 116 connected thereto. This by-pass conduit 114 communicates with said conduit 12 before said pressure regulating valve 17 is reached and again communicates therewith beyond said valve 17. Oil-gas may thus pass to said reducing valve 16 and thereby supply oil-gas to said burner 10 when it cannot pass through said regulating valve 17, thus keeping said burner 10 in operation, when desired. The operation is as follows:

At the start a suitable gas will be supplied to said tank 14 at the maximum pressure. This will place the entire system under equal pressure. Also, at the start of the operating cycle, and preferably before the consumer starts to use or draw oil-gas from the conduit 105 for consumption in his appliances, the retort 52 must have the required predetermined temperature of 800° F. that is necessary for gasification of the combined oil-gas and fuel oil that has been sprayed into the retort. The retort 52, at all times, must have this predetermined temperature throughout the gas-making cycle.

To accomplish this, a conduit 12 communicates with and draws oil-gas from tank 14, and feeds this oil-gas through said valve 17 that is normally open, which will be described later. The oil-gas is drawn through valve 17 to the pressure reducing valve 16, where the gas pressure is reduced to a lower gas pressure, as it enters the oil-gas control valve 86.

An electric current flows from panel board 34 to electric switch 33 through an electric wire 82 to double switch circuit 84 and then to switch 84a that is operated by thermostat 85, the latter being set in position to control the temperature of the retort at all times. Should the temperature within the retort fall below the predetermined temperature of 800° F., for instance, the thermostat 85 activates said switch 84a from which electric current flows through wire 89 to gas valve 86 opening it, thereby supplying oil-gas to feed the gas burner 10. When the gas burner has sufficiently heated the retort to the desired temperature, the thermostat 85 closes the electric switch 84a shutting off the oil-gas to gas burner 10, by closing electric gas valve 86. Thus the retort is kept at the proper temperatures at all times, automatically.

Oil-gas is drawn from the tank 14, through the conduits 100 and 105 to be consumed in the appliances or furnaces, or any other type apparatus that needs the application of gas heat. If the oil-gas pressure drops from the maximum 220 lbs., for instance, down to 210 lbs., pressure control device 36 opens to establish an electrical circuit so that electrical current flows from the panel board 34, to electric switch 33, then through electric wires 38 and 37 to dual-action valve 44, thereby opening the latter. As dual-action valve 44 opens it allows oil-gas to flow to the mixing chamber 46 through conduit 42.

When the oil-gas pressure drops to 209 lbs., for instance, in the gas storage tank 14, pressure control device 30 opens to establish an electrical circuit so that electrical current flows from the panel board 34 to electric switch 33, then through the circuit established through electric wire 38, pressure control device 36, wire 37, dual-action control valve 44 (which opens), and continuing through wire 53 to pressure control device 30 and wire 28 to thereby open electric fuel oil valve 26, thereby allowing oil-gas and fuel oil to flow into mixing chamber 46 and into retort 52 in a fine spray.

In the mixing chamber 46, the fuel oil and oil-gas under pressure intermingle thoroughly, and then pass to the spray nozzle 50, where the mixture is atomized and delivered into the retort 52. This fine atomized spray meets with a high pressure of oil-gas in the retort 52, at a temperature of 800° F., for instance. Thus this fine spray cracks into an oil-gas of a more permanent nature and then passes therefrom through a conduit 54 to said tank 14.

As the gas-making process continues in the retort 52 and the permanent oil-gas is passing into the gas storage tank 14, the pressure of oil-gas in the tank 14 builds up until it reaches the pressure of 219 lbs., for instance. Then the pressure control device 30 on said tank 14 automatically closes, thereby shutting off electric current through the electric wire 28 and closing dual-action, fuel oil valve 26. The pressure rises a little more in tank 14 such as ¼ lb., for instance, thereby automatically shutting off the pressure control device 36, which in turn shuts off the electric dual-action valve 44, through electric wire 37. By this action in first shutting off the fuel oil and then the oil-gas that is going into the mixing chamber 46, no more oil-gas is made in the retort. Upon consumption of more oil-gas through conduits 100 and 105 to appliances, for instance, the oil-gas making cycle will start again, as previously explained. Thus oil-gas is automatically made, stored, and consumed in a continuous cycle of operation.

It should be noted in this gas-making operation that when my apparatus calls for making oil-gas, the pressure control device 36 and the dual-action valve 44 are called into operation first at a pressure such as 210 lbs., for instance, and just before the fuel oil valve 26 opens. This prevents fuel oil in its raw form from entering the mixing chamber before the oil-gas, under high pressure, has reached there.

Also, in reverse, when enough oil-gas has been made and the gas-making cycle stops, the pressure control device 30 automatically shuts off first, at a pressure of 219 lbs., for instance, which automatically shuts off the fuel oil control valve 26 to prevent fuel oil from reaching the retort 52, before it is broken up by the pressure of oil-gas in the mixing chamber 46, and spray nozzle 50. Following the fuel oil shut off, the pressure rises slightly such as ¼ pound, and pressure control device 36 shuts off, thereby shutting off the dual-action valve 44, that supplies oil-gas to the mixing chamber 46.

Should the oil-gas making apparatus cease to function properly, I provide an auxiliary fuel, such as well-known city-gas, the operation of which is as follows: When the pressure in gas storage tank 14 drops to 207 lbs., for instance, the pressure control device 74 opens, thus establishing an electric circuit through electric wire 72 that extends to city-gas control valve 78. This opens the latter and allows city-gas to flow through conduit 80 and then through hand controlled valve 106 to conduit 105 and to the consumer's gas appliances or other heating apparatus.

After pressure control device 74 opens as explained at a pressure of 207 lbs., the pressure in said tank 14 continues to drop and when it reaches 205 lbs., for instance, pressure regulating valve 17 closes. This shuts off the oil-gas flowing through conduit 12, reducing valve 16, and oil-gas supply valve 86, thus shutting off oil-gas to burner 10. At the same moment, pressure regulating valve 103 in conduit 100 closes at said pressure of 205 lbs., for instance, shutting off oil-gas to conduits 100 and 105.

The reason for these two pressure regulating valves 17 and 103 closing is that when my gas-making system is out of order, no further oil-gas will be made until adjustments are made. Therefore, the closing of these two pressure regulating valves 17 and 103 insures that a sufficient quantity of oil-gas will be left in the gas storage tank 14, to provide an oil-gas pressure of at least 200 lbs., for instance, resulting in virtually equal distribution throughout the system, namely the tank 14, the retort 52, the oil receptacle 22, and connecting conduits. A definite pressure, a definite temperature, and a fine atomized spray are desirable to insure the cracking of the fuel oil to an oil-gas and all of the said three participants of the apparatus function simultaneously. Hence a definite oil-gas pressure should be maintained in the system.

After the mechanical or electrical failure of the gas-making apparatus is found and corrected, the following operations take place: The oil-gas, by-pass conduit valve 116 is opened by hand, allowing oil-gas from tank 14 to pass through conduit 12 and into by-pass conduit 114, by-passing pressure regulating valve 17 which is closed. The oil-gas then passes to the pressure reducing valve 16, then to the oil-gas control valve 86, then to the said burner 10 which heats the retort, bringing it up to the necessary predetermined temperature, as previously explained.

After the retort 52 reaches the desired predetermined temperature again and the gas-making apparatus is calling to make more oil-gas, because the oil-gas pressure in said tank 14 is below the maximum of 220 lbs., for instance, the complete cycle of gas-making starts again, as previously explained.

Also note, as the gas-making operation progresses and the gas pressure in the storage tank rises slightly above 205 lbs., for instance, the pressure regulating valves 17 and 103 open again, allowing oil-gas to flow through them again. Also, at slightly above 205 lbs., for instance, of oil-gas pressure in said tank 14, the by-pass hand valve 116 is to be closed manually, not being needed during the gas-making cycle. Also, as the oil-gas pressure rises further to 208 lbs., for instance, in the tank 14, the auxiliary fuel supply (city gas) pressure control device 74 is actuated to close the outside or city gas valve 78, thereby shutting off the auxiliary gas supply.

Also, I provide said thermostat 90, that, by means of switch 84b, electrically operates to open and close dual-action oil-gas control valve 44 and dual-action fuel oil valve 26, because it is desirable to keep the retort 52 at a predetermined range of temperature, such as about 800° F., for instance, at all times during the gas-making process. Therefore, thermostat 90, when the retort temperature becomes too high such as 850 degrees F., or too low, such as 750 degrees F., serves to close electrical circuits through wire 92 to dual-action valve 44, and through wire 94 to dual-action valve 26, closing both valves, thus preventing fuel oil and oil-gas from entering said retort. Thus in either case, if the temperature of retort 52 is too low or too high, control valves 44 and 26 will be closed to prevent the fine atomized spray of fuel oil and oil-gas from entering the retort.

When the retort 52 is at its predetermined temperature of said 800° F., for instance, thermostat 90 is inactive and does not interfere with the normal functioning of the opening and closing of the valves 44 and 26 in their operation during the gas-making cycle.

It will be understood that while I have given examples of pressure and heat, to illustrate the operation of my apparatus, they are for illustrative purposes only, and may be varied to whatever extent is required under any and all conditions.

What I claim is:

1. Apparatus to convert oil to gas comprising in combination:
   (a) a storage tank to store gas,
   (b) a supply receptacle to supply oil and gas and to receive gas from said storage tank,
   (c) a mixing chamber to receive gas and oil from said supply receptacle,
   (d) a retort to receive mixed oil and gas from said mixing chamber,
   (e) a burner adapted to heat said retort and to receive oil-gas from said storage tank,
   (f) a conduit from said storage tank to said burner,
   (g) a conduit from said retort to said storage tank,
   (h) a conduit to carry oil from a portion of said supply receptacle, to said mixing chamber,
   (i) a conduit to carry oil-gas from a portion of said supply receptacle to said mixing chamber,
   (j) a conduit to carry oil-gas from said storage tank to said supply receptacle, and
   (k) a conduit from said mixing chamber to said retort.

2. Apparatus to convert oil to gas as set forth in claim 1, having
   (l) a conduit from said storage tank to withdraw oil-gas therefrom for use outside my apparatus.

3. Apparatus to convert oil to gas as set forth in claim 2, having
   (m) a pressure reducing valve in said conduit (l).

4. Apparatus to convert oil to gas as set forth in claim 1, having
   (n) a conduit from said retort to said supply receptacle serving as a drain for said retort.

5. Apparatus to convert oil to gas as set forth in claim 1, having
   (o) a first pressure control device operatively connected to said storage tank, adapted to be actuated when the pressure in said tank reaches a predetermined minimum and a predetermined maximum,
   (p) a first dual-action control valve operatively connected to said conduit (h),
   (q) a first electricity conducting means connected to said first device (o) and to said first valve (p) and to a source of electrical supply, said first device (o) being adapted at said predetermined point, through this means (q) to actuate said first valve to open or closed position, depending respectively upon said minimum and maximum pressures in said tank,
   (r) a second pressure control device operatively connected to said storage tank adapted to be actuated when the pressure in said tank reaches a predetermined minimum and a predetermined maximum,
   (s) a second dual-action control valve operatively connected to said conduit (i) and
   (t) second electricity conducting means connected to said second device and to said second valve (s) and to a source of electrical supply, said second device being adapted at a predetermined point, through said second means (t) to actuate said second valve (s) to open or closed position depending upon said minimum and maximum pressure present in said tank as set forth in (r).

6. Apparatus to convert oil to gas as set forth in claim 5, having:
   (u) a thermostat connected to said retort (d) adapted to be actuated at predetermined temperatures,
   (v) a control valve in said conduit (f),
   (w) electricity conducting means connected to thermostate (u) and control valve (v) and to a source of electrical supply and adapted to close and open an electrical circuit when said thermostat (u) respectively reaches predetermined minimum and maximum temperatures to thereby respectively open and close said control valve (v).

7. Apparatus to convert oil to gas as set forth in claim 6 having
   (x) a second thermostat connected to said retort (d) adapted to be actuated at predetermined temperatures,
   (y) electricity conducting means connected to said second thermostat (x), to a source of electrical supply and to control valve (p) adapted to close and open an electrical circuit when said thermostat (x) respectively reaches predetermined minimum and maximum temperatures to thereby respectively close and open said control valve (p), and
   (z) electricity conducting means connected to said second thermostat (x), to a source of electrical supply and to control valve (s) adapted to close and open an electrical circuit when said thermostat (x) respectively reaches predetermined minimum and maximum temperatures to thereby respectively close and open said control valve (s).

8. Apparatus to convert oil to gas as set forth in claim 5 and having:
   a conduit (l) from said storage tank to withdraw oil-gas therefrom for use outside the apparatus, and
      (aa) a third pressure control device operatively connected to said storage tank (a) adapted to be actuated when the pressure in said tank reaches a predetermined minimum and a predetermined maximum,
      (bb) a control valve,
      (cc) a conduit to receive auxiliary gas from outside the apparatus and communicating with said valve (bb) and said conduit (l),
      (dd) electricity conducting means connected to said third pressure control device (aa) and to a source of electrical supply, said third pressure control device (aa) being adapted at a predetermined point, through said electricity conducting means (dd) to actuate said control valve (bb) to open or closed position depending upon said minimum and maximum pressure present in said tank (a) as set forth in (aa).

9. Apparatus to convert oil to gas as set forth in claim 8 having:
   (ee) a pressure regulating valve in conduit (l)
   (ff) electricity conducting means connected to said pressure regulating valve (ee) and to a source of electrical supply, said pressure regulating valve (ee) being adapted at a predetermined point, through said electricity conducting means (ff) to close or open depending upon respectively the minimum and maximum pressure present in said tank (a).

10. Apparatus to convert oil to gas set forth in claim 9 having:
   (gg) a pressure regulating valve in conduit (f)
   (hh) electricity conducting means connected to said pressure regulating valve (gg) and to a source of electrical supply, said pressure regulating valve (gg) being adapted at a predetermined point, through said electricity conducting means (hh) to close or open depending upon respectively the minimum and maximum pressure present in said tank (a).

References Cited by the Examiner
UNITED STATES PATENTS

| | | | |
|---|---|---|---|
| 261,546 | 7/82 | Goldsmith | 48—104 |
| 1,002,025 | 8/11 | Berry | 48—106 X |
| 2,379,979 | 7/45 | Michaud | 158—79 X |
| 2,860,694 | 11/58 | Edens et al. | 158—53 |
| 3,055,750 | 9/62 | DeCarolis | 48—106 X |
| 3,107,719 | 10/63 | Buckley | 158—53 |

MORRIS O. WOLK, *Primary Examiner.*

FREDERICK KETTERER, EDWARD J. MICHAELL,
*Examiners.*